Patented Mar. 16, 1954

2,672,455

UNITED STATES PATENT OFFICE 2,672,455

LEATHER WATER REPELLENT

Chester Carlyle Currie, Midland, Mich., assignor to Dow Corning Corporation, Midland, Mich., a corporation of Michigan No Drawing. Application August 4, 1952, Serial No. 302,620

10 Claims. (Cl. 260—29.1)

This invention relates to a water repellent composition and leather impregnated therewith.

The water repellent composiiton comprises a mixture of (1) 15 to 50 per cent by weight of a hydrolyzable titanium compound of the formula Ti(OR)$_4$ or an aliphatic hydrocarbon soluble partial hydrolyzate thereof, in which titanium compounds R is an aliphatic hydrocarbon radical of less than 13 carbon atoms or a hydroxylated aliphatic hydrocarbon radical of less than 13 carbon atoms containing less than 4 hydroxyl groups; (2) 5 to 70 per cent by weight of a methylpolysiloxane resin composed of trimethylsiloxane units and SiO$_2$ units in such proportion that the ratio of methyl radicals to silicon atoms is from 1.0:1 to 2.5:1; and (3) 15 to 80 per cent by weight of polysiloxanes having the general formula

where R' may be an alkyl or alkylene radical of less than 4 carbon atoms, or a monocyclicaryl radical and where $n$ has an average value of 2.0 to 2.9 inclusive.

The compositions of this invention may be applied to any type of leather, tanned, tawed or otherwise cured, and to finished or unfinished leather.

As a result of impregnation with the compositions of this inventon leather is obtained having a resistance to water penetration ranging from five fold to one hundred fifty fold increase over those previously known.

Application of the compositions to leather may be readily accomplished by brushing or dipping and may be applied to leather sheets or leather articles such as shoes, belts, etc. These repellent compositions may be employed in the form of solvent-less pastes which may, if desired, contain polishing agents, or in the form of solvent solutions.

Preferably (at least on a commercial scale) application is accomplished by employing a solvent solution using any solvents which are harmless to leather e. g. non-aromatic solvents such as Stoddard Solvent, naphtha mineral spirits, etc. Excellent results are obtained by impregnating leather to the extent of 1 to 30 per cent by weight of the water repellent composition (based on the weight of the leather). The impregnation of greater amounts is ordinarily not necessary although excellent water repellency may be obtained by impregnating up to 50 per cent. Leather containing 2 to 25 per cent by weight of the compositions of this invention is preferred with best results being obtained with leather containing 10 to 20 per cent of these water repellent compositions. As many applications of these compositions to leather as is necessary to effect the desired degree of impregnation may be employed. Ordinarily two applications with a 15 per cent solution is sufficient.

The methylpolysiloxane resinous copolymer composed of trimethylsiloxane units and SiO$_2$ units employed herein may be prepared by the cohydrolysis of  and  a hydrolyzable radical, employing, of course, such proportions as necessary to obtain the desired CH$_3$/Si ratio of from 1.0:1 to 2.5:1. Preferred are resinous copolymers having a methyl to silicon ratio of from 1.0:1 to 2.5:1. Alternatively, this copolymer may be prepared by reacting (CH$_3$)$_3$SiCl, (CH$_3$)$_3$SiOC$_2$H$_5$ or (CH$_3$)$_3$SiOSi(CH$_3$)$_3$ with an acidic silica sol. Such a method is fully described in the copending application of William H. Daudt and Leslie J. Tyler, Serial No. 184,720, filed September 13, 1950, and assigned to the same assignee as this invention. The copolymers of trimethylsiloxane and SiO$_2$ referred to supra are characterized by being readily soluble or dispersable in organic solvents.

The titanium compounds suitable for employment in the composition of this invention are those esters having the general formula Ti(OR)$_4$ where R is an aliphatic hydrocarbon radical of less than 13 carbon atoms, or a hydroxylated aliphatic hydrocarbon radical of less than 13 carbon atoms and containing less than 4 OH radicals, and partially hydrolyzed Ti(OR)$_4$ compounds that are substantially soluble in aliphatic hydrocarbon solvents. Thus titanium esters such as tetramethyl titanate, tetraethyl titanate, tetradecyl titanate, octylene glycolyl titanate, tetra 2-ethyl hexyl titanate, tetradodecyl titanate, tetra-isopropyl titanate, and any mixtures thereof may be used. Titanium esters wherein R is the same or mixed radicals are likewise suitable. Preferably, the R groups should have at least 3 carbon atoms. These esters are prepared ordinarily by ester interchange of a titanium ester such as tetramethyl titanate with a higher boiling alcohol. For example, octylene glycolyl titanate is readily prepared by reacting octylene glycol with tetramethyl titanate in molar proportion of 4 to 1. Partially hydrolyzed Ti(OR)$_4$ compounds may be employed if the hydrolysis has not rendered the compounds insoluble in aliphatic solvents (such as Stoddard Solvent). If partially hydrolyzed titanium compounds are employed particular care is necessary to prevent undue formation of insoluble TiO₂. On the basis of commercial availability, tetrabutyl titanate is preferred. All of the titanium esters mentioned in the examples of this application are commercially available.

The third essential ingredient employed herein is organopolysiloxanes having the general formula $$R'_n SiO_{\frac{4-n}{2}}$$

where R' may be alkyl or alkylene radicals of less than 4 carbon atoms, or monocyclicaryl radicals, and $n$ has an average value of 2.0 to 2.9 inclusive. These materials are employed in amount of from 15 to 85 per cent by weight of the total composition. Specific examples of operative siloxanes are dimethylpolysiloxane, vinylmethylsiloxane, phenylethylsiloxane, dipropylsiloxane, methylxenylsiloxanes or any mixtures thereof. Also copolymers of such diorganosiloxanes with triorganosiloxanes such as trimethylsiloxane, phenyldimethylsiloxane, etc. are operative. Traces of monoorganosiloxane units may also be present in these siloxanes as long as the value of $n$ remains substantially in the range specified.

These organosiloxanes are benzene soluble materials which vary in viscosity from thin fluids to deformable solids. Generally preferred are fluid polymers having viscosities ranging from 5 to 100,000 centistokes at 25° C. Methylpolysiloxanes are the preferred species.

The above components may be mixed in the solvent free state by employing common mixing equipment. It is generally more convenient, however, to effect mixing by employing solvents which may be retained after mixing to yield solutions ready for use. Suitable leather polishing waxes and dyes may be added to the compositions of this invention. Any solvent may be employed which is harmless to leather and capable of dispersing the compositions of this invention.

The outstanding advantages of this invention are clearly demonstrated by impregnating leather and testing in the manner described below.

The leather impregnated in the examples is "Tomahawk Kip," a commercial emulsion top vegetable tanned cowhide. However, the products of this invention are equally applicable to leather from horse hide, pig skin, and other animals.

Sample pieces of such leather measuring 4 x 4⅜ inches and varying between 0.05 and 0.06 inch in thickness were tested in an Upper Leather Water Penetration Machine. This machine is a slight modification of the machine pictured and described on pages 401-2 of the August 1947, issue of "Journal of the American Leather Chemists Association." This testing machine consists of a pair of V clamping heads, one of such heads being movable downward over an arc of 30°. The leather sample is clamped to the V heads to form thereby a leather trough which is sealed at each end by means of gasketed V blocks.

The leather trough so formed is partially immersed in water and flexed by the movable head. Such flexing produces a single wrinkle in the center of the trough and simultaneously places the upper edges of the leather trough under tension. The machine runs at 72 flexes per minute. The number of cycles required for leather to wet through is determined by observing the appearance of a tiny bead of water which usually appears at either end of the wrinkle. The number of cycles required for the appearance of this drop or water is known as the "first drop" number.

This invention is illustrated by the following examples but is not limited except as defined in the claims. The benefits of this invention are not obtained employing mixtures whose ingredients are in proportions outside the scope set forth in the claims.

EXAMPLE 1

Samples of leather were impregnated by dipping in Stoddard Solvent (B. P. 308–380° F.) solutions containing the compositions of Table I. Samples were immersed for 30 seconds and then air dried for 16 hours, then reimmersed for 30 seconds and again air dried for 16 hours prior to testing. The amount of impregnation (expressed as per cent pickup) based on the weight of the leather was determined by difference in weight. All impregnated samples were tested in the Upper Leather Penetration Machine and the "first drop" numbers are recorded in Table I.

Mixtures tabulated in Table I were made by mixing the following materials A, B, and C in various proportions.

A. A methylpolysiloxane copolymer composed of $(CH_3)_3SiO$ units and $SiO_2$ units having a $CH_3/Si$ ratio of 1.2:1.

B. A methylpolysiloxane having the composition 97 mol per cent $(CH_3)_2SiO$ and 3 mol per cent $(CH_3)_3SiO_{\frac{1}{2}}$.

C. Tetrabutyl titanate.

Mixing was readily accomplished by dissolving all components in Stoddard Solvent (B. P. 308–380° F.) and adjusting the total solids to 15 per cent by weight. Check samples were tested in all cases and the average "first drop" values tabulated in Table I.

Table I

| Mixture No. | Composition of Mixture in percent by weight | | | Average percent pickup by weight | Average No. of flexes first drop |
|---|---|---|---|---|---|
| | (A) | (B) | (C) | | |
| 1 | 100 | | | 13.8 | 176 |
| 2 | | 100 | | 19.6 | 101 |
| 3 | | | 100 | 5.2 | 167 |
| 4 | 17.5 | 65 | 17.5 | 14.1 | 1,633 |
| 5 | 33.33 | 50 | 16.67 | 18.2 | 41,842 |
| 6 | 5 | 75 | 20 | 14.0 | 3,322 |
| 7 | 50 | 33.3 | 16.7 | 15.8 | 7,480 |
| 8 | 10 | 50 | 40 | 13.7 | 15,188 |
| 9 | 16.7 | 33.3 | 50 | 11.9 | 6,931 |
| 10 | 33.3 | 16.7 | 50 | 12.3 | 7,199 |
| 11 | 50 | 16.7 | 33.3 | 12.5 | 4,313 |
| 12 | 56 | 24 | 20 | 21.3 | 6,857 |
| 13 | 33.33 | 33.33 | 33.33 | 16.2 | 49,375 |
| 14 | | 30 | 70 | 7.8 | 612 |
| 15 | 50 | | 50 | 7.6 | 850 |
| 16 | 70 | 30 | | 20.4 | 148 |

In the preceding table, the water repellency effected by the compositions of this invention is exemplified by mixtures 4–13 inclusive. The inferior results obtained employing any single component of the mixture is indicated in mixtures 1 through 3. Mixtures 14, 15, and 16 show the water repellency obtained employing binary mixtures AB, BC, and AC. Unimpregnated leather samples have "first drop values ranging from 30 to 60.

EXAMPLE 2

In the same manner as in Example 1, leather samples were impregnated employing a 15 per cent solids solution of mixtures composed of equal weight portions of compositions A, B, and the titanium compounds listed in Table II.

Table II

| Compound | Average percent pickup | Average No. of flexes first drop |
| --- | --- | --- |
| tetra 2-ethyl hexyl titanate | 12.2 | 26,000 |
| octylene glycolyl titanate | 14.6 | 5,133 |
| tetra isopropyl titanate | 13.5 | 9,647 |

The above titanium compounds are commercially available fluids soluble in Stoddard Solvent or naphtha mineral spirits. They were prepared by reacting a mol of tetramethyl or tetraethyl titanate with 4 mols of 2-ethyl hexanol, 2-ethyl hexanediol 1,3, and isopropanol respectively.

EXAMPLE 3

When leather is impregnated in the manner of Example 1, with a composition consisting of equal parts by weight of compositions A and B of Example 1 and tetramethyl titanate or tetradodecyl titanate, excellent water repellency is obtained.

EXAMPLE 4

Mixtures comprising equal parts by weight of compositions A and C and 100 cs. phenylmethylsiloxane or ethylvinylsiloxane fluids, bring about excellent resistance to water penetration when impregnated into leather in accordance with Example 1.

EXAMPLE 5

When a titanium ester such as $$Ti(OCH_2CH_2CH_2CH=CH_2)_4$$

which may be prepared by ester interchange of tetramethyl titanate with beta-allyl-ethyl alcohol, is employed in place of tetrabutyl titanate in the mixtures of Example 1, equivalent results are obtained.

That which is claimed is:

1. As a composition of matter, a mixture comprising (1) 15 to 50 per cent by weight of a titanium compound selected from the group consisting of titanium compounds having the general formula $Ti(OR)_4$ and aliphatic hydrocarbon soluble partial hydrolyzates thereof in which compounds R is selected from the group consisting of aliphatic hydrocarbon radicals of less than 13 carbon atoms and hydroxylated aliphatic hydrocarbon radicals of less than 13 carbon atoms and containing less than 4 hydroxy radicals; (2) 5 to 70 per cent by weight of a methyl polysiloxane copolymer composed of trimethylsiloxane units and $SiO_2$ units, said units being in such proportion that the ratio of methyl radicals to silicon atoms is from 1.0:1 to 2.5:1; and (3) 15 to 80 per cent by weight of a polysiloxane having the general formula $$R'_n SiO_{\frac{4-n}{2}}$$

where R' is a radical selected from the group consisting of alkyl and alkylene radicals of less than 4 carbon atoms, and monocyclicaryl radicals, and $n$ has an average value of 2 to 2.9, each silicon atom in said polysiloxane (3) having at least one of the defined hydrocarbon radicals attached thereto.

2. The composition of claim 1 where R' is an alkyl radical of less than 4 carbon atoms.

3. The composition of claim 1 wherein R is a butyl radical.

4. As an article of manufacture, leather impregnated with 1 to 50 per cent by weight based on the weight of the leather of the composition of claim 1.

5. As a composition of matter a mixture comprising (1) 15 to 50 per cent by weight of a titanium compound selected from the group consisting of titanium compounds having the general formula $Ti(OR)_4$ and aliphatic hydrocarbon soluble partial hydrolyzates thereof, in said compounds R being selected from the group consisting of aliphatic hydrocarbon radicals of less than 13 carbon atoms and hydroxylated aliphatic hydrocarbon radicals of less than 13 carbon atoms and containing less than 4 hydroxy radicals; (2) 5 to 70 per cent by weight of a methylpolysiloxane composed of trimethylsiloxane units and $SiO_2$ units, said units being in such proportion that the ratio of methyl radicals to silicon atoms is from 1.0:1 to 2.5:1; and (3) 15 to 80 per cent by weight of a polysiloxane having the formula $$(CH_3)_n SiO_{\frac{4-n}{2}}$$

where $n$ has an average value of 2.0 to 2.9, each silicon atom in said polysiloxane (3) having at least one methyl radical attached thereto.

6. The composition of claim 5 where R is butyl.

7. As an article of manufacture, leather impregnated with 1 to 50 per cent by weight based on the weight of the leather of the composition of claim 5.

8. As a composition of matter a mixture comprising (1) 15 to 50 per cent by weight of a titanium compound selected from the group consisting of titanium compounds having the general formula $Ti(OR)_4$ and aliphatic hydrocarbon soluble partial hydrolyzates thereof, in said compounds R being selected from the group consisting of aliphatic hydrocarbon radicals of less than 13 carbon atoms and hydroxylated aliphatic hydrocarbon radicals of less than 13 carbon atoms and containing less than 4 hydroxy groups; (2) 5 to 70 per cent by weight of a methylpolysiloxane copolymer composed of trimethylsiloxane units and $SiO_2$ units, said units being in such proportion that the ratio of methyl radicals to silicon atoms is from 1.0:1 to 2.5:1; and (3) 15 to 80 per cent by weight of a polysiloxane having the formula $$(CH_3)_n SiO_{\frac{4-n}{2}}$$

where $n$ has an average value of 2.0 to 2.9, each silicon atom in said polysiloxane (3) having at least one methyl radical attached thereto.

9. The composition of claim 8 wherein R is a butyl radical.

10. As an article of manufacture, leather impregnated with from 1 to 50 per cent by weight based on the weight of the leather of the composition of claim 8.

CHESTER CARLYLE CURRIE.

References Cited in the file of this patent

UNITED STATES PATENTS

| Number | Name | Date |
| --- | --- | --- |
| 2,512,058 | Gulledge | June 20, 1950 |
| 2,568,384 | Cheronis | Sept. 18, 1951 |